UNITED STATES PATENT OFFICE.

JOHN KELSEY, OF DETROIT, MICHIGAN.

COMPOSITION.

SPECIFICATION forming part of Letters Patent No. 670,919, dated March 26, 1901.

Application filed December 1, 1899. Serial No. 738,815. (No specimens.)

*To all whom it may concern:*

Be it known that I, JOHN KELSEY, a citizen of the United States, residing at Detroit, in the county of Wayne and State of Michigan, have invented certain new and useful Improvements in Compositions, of which the following is a specification.

My invention consists in a new composition of matter adapted to be mixed into a plastic compound, shaped into the desired form, (as in a mold,) and then dried to produce a hard tough article capable of receiving a superior finish.

For the body of my composition I use wood-pulp in its fibrous or shredded form. In this condition it consists of quite long fibers capable of separation or separated so as to be capable of thorough amalgamation with a cement and of such length as to bind the compound into a homogeneous mass. The cement which I prefer consists of a cereal flour and plaster, such as what is commercially known as "reground" plaster.

I have obtained the best results for such a composition as follows, the measurements of the ingredients being on the basis of weight: For seven pounds of wood fiber I use six pounds of cement. The cement consists of fifty per cent. of wheat-flour (preferably using what is known as "Red-dog" No. 2) and twenty per cent. of buckwheat. With this I mix thirty per cent. of the plaster, such as reground plaster, the whole being mixed together with sufficient water to make a pasty mass. Such a composition I find can be easily molded, is extremely hard and tough, and will take a finish, so that, for instance, wood or bone may be imitated quite successfully in such articles as knife and fork handles, umbrella-handles, &c.

The wood fiber acts as a body and binds the mass together, the flour acts as a cement, and the plaster gives a finer grain and hardens it, besides adding considerably to the cementing qualities of the mass.

For the cereal cement or paste, while I may use simply wheat-flour or other cereal, I prefer the composition described, as I find that the wheat-flour alone is apt to make the article more brittle, which difficulty is overcome by the addition of buckwheat.

The proportions I mention are desirable for such articles as umbrella-handles, &c.; but these proportions may be varied somewhat for other articles according to the hardness desired or the finish to be given the article.

What I claim as my invention is—

1. A hardening compound for the manufacture of various articles consisting of wood fiber, and a cement of a cereal flour and plaster.

2. A hardening compound for the manufacture of various articles, consisting of wood fiber in its shredded form, and a cement comprising plaster, and wheat and buckwheat flour.

3. A hardening compound for the manufacture of various articles comprising shredded wood fiber and a cement consisting of about fifty per cent. wheat-flour and twenty per cent. buckwheat-flour, and thirty per cent. "reground plaster," combined as described.

In testimony whereof I affix my signature in presence of two witnesses.

JOHN KELSEY.

Witnesses:
L. J. WHITTEMORE,
H. C. SMITH.